Aug. 30, 1966  J. J. FISCHER ETAL  3,269,024
METHOD AND MEANS FOR ALIGNING AN AXIS ON A GIMBALED PLATFORM
Filed Dec. 20, 1961
4 Sheets-Sheet 1

INVENTOR.
JOHN J. FISCHER
FRANK M. PELTESON
BY
*Ernest L Brown*
ATTORNEY

Aug. 30, 1966  J. J. FISCHER ETAL  3,269,024
METHOD AND MEANS FOR ALIGNING AN AXIS ON A GIMBALED PLATFORM
Filed Dec. 20, 1961  4 Sheets-Sheet 3

INVENTORS
JOHN J. FISCHER
FRANK M. PELTESON
BY
*Ernest L. Brown*
ATTORNEY

INVENTORS
JOHN J. FISCHER
FRANK M. PELTESON
BY
*Ernest L. Brown*
ATTORNEY

United States Patent Office 3,269,024
Patented August 30, 1966

3,269,024
METHOD AND MEANS FOR ALIGNING AN AXIS ON A GIMBALED PLATFORM
John J. Fischer, Fullerton, and Frank M. Pelteson, Long Beach, Calif., assignors to North American Aviation, Inc.
Filed Dec. 20, 1961, Ser. No. 160,728
4 Claims. (Cl. 33—226)

This invention pertains to a method and means for aligning a predetermined axis affixed to a gimbal-supported platform, and more particularly to a means and method for aligning the axis of rotation of a gimbal-supported platform into parallel alignment with the axis of rotation of the earth.

The inertial reference device which is aligned by this invention is adapted to be carried on a vehicle which has a cartesian set of coordinates fixed thereon, designated in accordance with the known art as the roll, pitch, and yaw axes of the vehicle. The inertial reference device uses a platform or frame which is gimbaled relative to its supporting vehicle. The alignment procedure is carried out before the vehicle is in flight.

The gimbal-supported platform has affixed thereto angular reference means such as gyroscopes or vibrating strings. The gyroscopes or vibrating strings are untorqued, which simplifies their structure. The drift of the inertial angular reference means relative to the platform is sensed and used to drive appropriate motors on the gimbal axes to cause the platform to follow the inertial angular reference means.

The state of the gyroscope and vibrating string art has progressed to the point where their drift rate is substantially constant. Since the platform is slaved to the drift of the inertial angular reference means (one inertial angular reference means controlling about each axis of a cartesian set of axes positioned on the platform) the platform rotates at a substantially constant rate about an axis which is fixed on the platform and fixed relative to the stars. The axis of rotation of the platform usually does not coincide with any of the principal axis of the cartesian set of coordinates fixed on the platform.

Means for measuring linear acceleration are affixed to the platform. The acceleration measuring means are adapted to sense acceleration along three mutually perpendicular coordinate axes, preferably the aforementioned cartesian set of axes which are fixed on the platform.

To simplify the interpretation of the signals received from the acceleration measuring means for further use in a guidance system, it is preferable to align the axis of angular drift of the platform substantially parallel to the axis of rotation of the earth.

Before the axis of angular drift of the platform is aligned parallel to the axis of rotation of the earth, the direction of the axis of angular drift of the platform must be determined in coordinates of the cartesian set of axes which are fixed upon the platform. U.S. Patent No. 3,127,774, entitled, "Means and Method for Determining the Axis of Rotation of a Controllably Rotating Platform," by John J. Fischer et al. assigned to North American Aviation, Inc., the assignee of this application, describes a means and method for determining the components of angular drift of the platform in terms of the cartesian set of coordinates fixed upon the platform.

This invention is concerned with a method and means for aligning the axis of angular drift of the platform substantially parallel to the polar axis of the earth.

The method and means for aligning, in accordance with this invention, is also adapated to align any predetermined axis fixed on the platform with a predetermined axis fixed on the earth. By varying the gimbal angles as a predetermined function of time, an axis in platform coordinates can be aligned with another axis in a coordinate system rotating with respect to the platform coordinate system.

It is an object of this invention to align the axis of drift of a rotating platform substantially parallel to the axis of the earth.

It is another object of this invention to control the axis of drift of a rotating platform to cause said axis to be substantially parallel to the axis of rotation of the earth.

It is a broader object of this invention to align an axis in a first coordinate system, fixed on a gimbaled member, into parallel with an axis in a second coordinate system.

It is a more particular object of this invention to gimbal-support an angularly drifting platform with its axis of angular drift substantially parallel to the axis of the earth.

It is also an object of this invention to align an axis which is fixed in a first rotating rigid body with an axis which is fixed in a second rotating rigid body.

It is a specific object of this invention to provide means and methods for achieving the above enumerated objects.

Other objects will become apparent from the following description taken in connection with the accompanying drawings in which.

Figure 1:
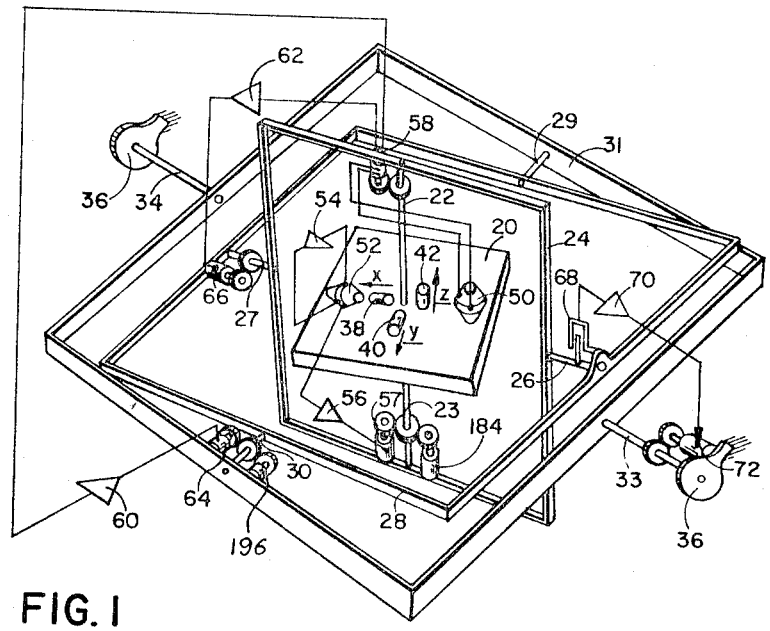
FIG. 1 is a first embodiment of a rotatable platform which is calibrated by this invention.
Figure 2:
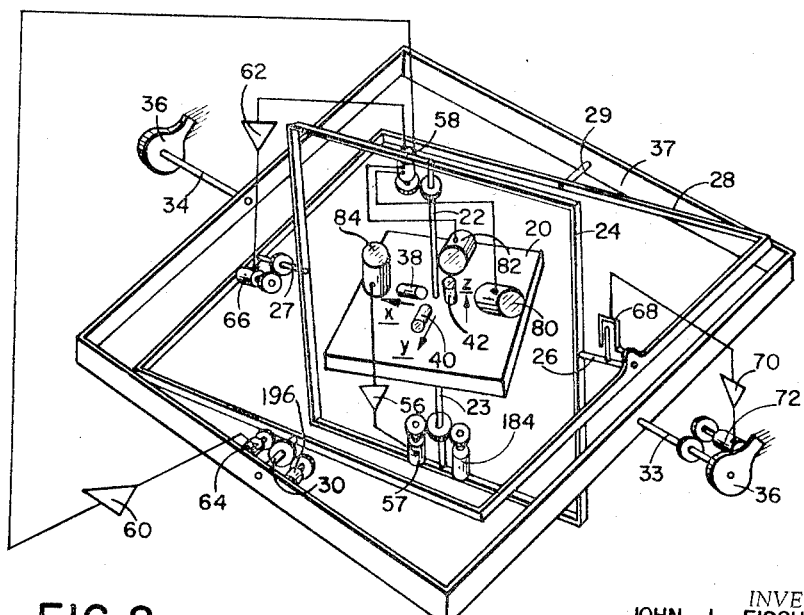
FIG. 2 is a second embodiment of a rotatable platform which is calibrated by this invention.

In FIGS. 1 and 2 a rotatable, gimbaled platform 20 is supported for rotation about a first axis, denoted the Z azis, upon coaxial shafts 22 and 23. Shafts 22 and 23 are mounted for rotation relative to gimbal 24 upon bearings (not shown). Gimbal 24 is mounted for rotation, relative to gimbal 28, upon coaxial shafts 26 and 27 whose common axis is perpendicular to the axis of shafts 22 and 23. Gimbal 28 is mounted for rotation, relative to gimbal 31, upon coaxial shafts 29 and 30, whose common axis is perpendicular to the axis of shafts 26 and 27. Gimbal 31 is mounted for rotation, relative to a supporting vehicle 36, upon coaxial shafts 33 and 34 whose common axis is perpendicular to the axis of shafts 29 and 30.

Three accelerometers 38, 40, and 42 are affixed to platform 20 with their sensitive axes forming an orthogonal set of coordinates. The set of coordinates defined by the sensitive axes of accelerometers 38, 40, and 42 are called the platform coordinates and are designated herein as X, Y, and Z, respectively. Alternatively, two two-axis accelerometers could replace all three accelerometers.

Figure 3:
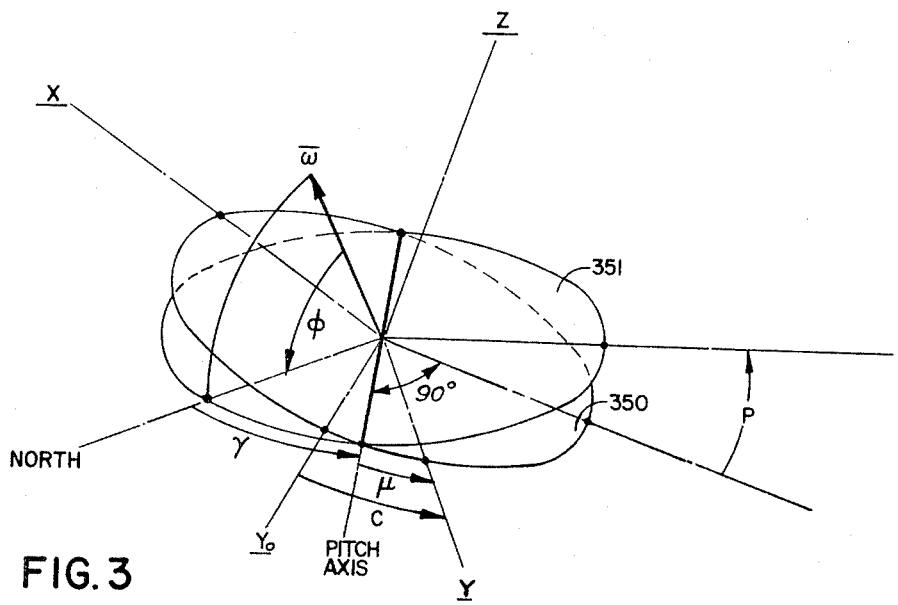
FIG. 3 is a diagram of a coordinate system useful in describing the means and method of this invention.

In FIG. 1, platform 20 and its supporting gimbal system are controlled by a pair of free-rotor gyroscopes 50 and 52 (see FIG. 3). Free-rotor gyroscope 50 has its spin axis oriented in the direction of the Z axis of platform 20 to cause gyroscope 50 to be sensitive to angular displacement about the X and Y axes between the rotor of gyroscope 50 and platform 20.

Free-rotor gyroscope 52 has its spin axis in the plane of the X and Y axes. The orientation of the spin axis of gyroscope 52 in the plane of the X and Y axes is not critical. Gyroscope 52 senses angular displacement about the Z axis between the rotor of gyroscope 52 and platform 20.

The rotor of gyroscope 52 is caged about its sensitive axis which is in the horizontal plane. The caging of gyroscope 52 is accomplished by sensing the angular displacement relative to platform 20 of the rotor of gyroscope 52 about its horizontal sensitive axis, amplifying the sensed signal by means of amplifier 54, and torquing gyroscope 52 as described more particularly below to return the sensed signal to zero.

Gyroscope 52 could be replaced by a conventional single degree of freedom gyroscope which is sensitive only to angular displacement about the Z axis.

The signal at the Z axis output of gyroscope 52 is connected through amplifier 56 to motor 57 which is mechanically connected between shaft 23 and gimbal 24 to drive platform 20 in a direction to reduce the signal to zero at the Z axis output of the gyroscope 52.

The X axis output signal and the Y axis output signal of gyroscope 50 are connected through resolver 58 and amplifiers 60 and 62 to motors 64 and 66, respectively. Motor 64 is mechanically connected to drive gimbal 28 relative to gimbal 31 and motor 66 is mechanically connected to drive gimbal 24 relative to gimbal 28 in directions to return to zero the signals at the X axis and the Y axis outputs of gyroscope 50.

The connections described above and shown in FIGS. 1 and 2 actually represent in each case one condition of a multi-position switching system not shown in these figures.

An angle sensing means 68 is mechanically positioned to detect angular deviation from a right angle between gimbals 24 and 28. A signal generated by pickoff means 68 is connected through amplifier 70 to a motor 72. Motor 72 is mechanically positioned to drive gimbal 31 relative to the supporting means 36 in a direction to return to zero the signal at pickoff means 68. When the signal at pickoff means 68 is zero, the planes of gimbals 24 and 28 are perpendicular.

In FIG. 2, three single axis inertial angular error sensors such as single degree of freedom gyroscopes or vibrating strings 80, 82, and 84 are positioned upon platform 20 to sense platform angular rotation error about the X, Y, and Z axes, respectively. The Z axis output of inertial angular reference means 84 is connected through amplifier 56 to motor 57 to drive platform 20 relative to gimbal 24 in a direction to return to zero the Z axis output signal of angular reference means 84. The X and Y axes outputs of inertial angular reference means 80 and 82 are connected through resolver 58 and amplifiers 60 and 62 to motors 64 and 66 to drive gimbals 28 and 24 in directions to return to zero the output signals of inertial reference means 80 and 82. Pickoff means 68 is connected through amplifier 70 to motor 72 to drive gimbal 31 relative to the supporting means 36 in a direction to return to zero the output signal of pickoff means 68.

MEANS AND METHOD FOR ALIGNING THE AXIS OF ANGULAR DRIFT OF PLATFORM 20 SUBSTANTIALLY PARALLEL TO THE AXIS OF ROTATION OF THE EARTH

From the calibration technique disclosed in our above cited Patent No. 3,127,774, the components $\omega_x$, $\omega_y$ and $\omega_z$ of the angular velocity of drift of platform 20 are obtained. These components, together with the latitude angle, $\phi$, of the platform, at the earth position where it is aligned to have its axis of drift parallel with the earth's polar axis, are used to compute automatically the gimbal rotations required to point the axis of drift parallel to the polar axis of the earth, and to servo the gimbals through the computed angles to cause said alignment.

To practice this invention, the outer gimbal must be rotatable about a non-vertical axis, the intermediate gimbal must be rotatable about a cross-level axis relative to the outer gimbal, and the platform must be rotatable, relative to the intermediate gimbal, about an axis perpendicular to the cross-level axis.

In the described device which is aligned by this invention, outer gimbal 31 is rotatable upon shafts 33 and 34 about a substantially level axis. Although the axis of shafts 33 and 34 is usually parallel to the roll axis of the supporting craft (and is so described herein), it may be oriented in any desired azimuth (for example parallel to the pitch axis of the supporting craft).

Intermediate gimbal 28 is rotatable relative to outer gimbal 31 about the cross-level axis of shafts 29 and 30. The cross-level axis is designated herein to correspond to the pitch axis of the craft. The important characteristic of the cross-level axis is that it is level. As long as the axis of shafts 33 and 34 is non-vertical, rotation of the shafts may be used to level the cross-level axis.

Gimbals 24 and 28 may, for the purposes of this invention, be considered as one gimbal since they are constrained or servoed to move together. The cross-level axis of shafts 29 and 30 is leveled by servoing motor 66, through resolver 58 and amplifier 62, to the outputs of accelerometers 38 and 40.

Figure 5:
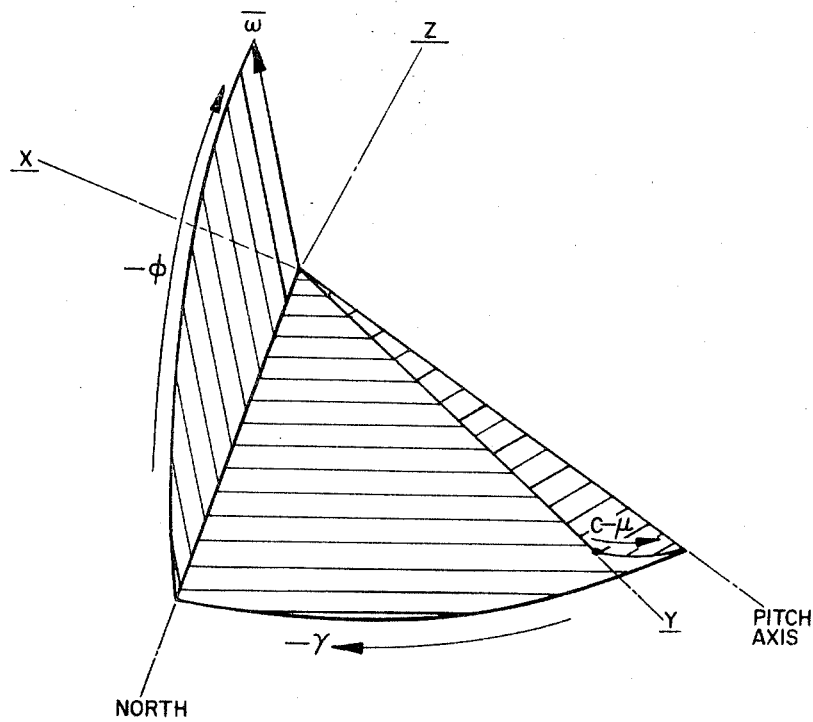
FIG. 5 is a diagram of the rotations used to derive a second portion of the matrix equations used in this invention showing rotations from the Y axis into the axis of the angular velocity of drift of the platform.

At the start of the aligning operation of this invention, the platform is leveled as shown and described in applicants' above cited patent in connection with FIG. 5 therein. However, the axis of shafts 29 and 30 should be aligned close to the east-west axis rather than the north-south axis. It is usually not necessary to align the cross-level axis exactly east-west.

Referring to FIG. 3, the cross-level axis of shafts 29 and 30 is designated along the pitch axis of the supporting craft. Ellipse 351 marks the horizontal plane through shafts 29, 30. The cross-level axis of shafts 29 and 30 is maintained horizontal during the $\bar{\omega}$ axis alignment procedure of this invention. Ellipse 350 is in the plane of gimbal 28 which is shown tilted, relative to the horizontal plane of ellipse 351 through an angle P. Since the axis of the angular velocity of drift $\bar{\omega}$ is fixedly positioned on platform 20, it also tilts, with gimbal 28, relative to the plane of ellipse 351. Platform 20 is rotated through an angle C about the axis of shafts 22 and 23, which is the Z axis of the platform, until $\bar{\omega}$ is aligned in a predetermined direction. The X and Y axes are also shown rotated from initial directions $X_0$ (not shown) and $Y_0$ (shown in FIG. 3), respectively through an angle C, in the plane of ellipse 350, about the Z axis. The tilting through angle P and the rotating through angle C cause the axis of angular drift of platform 20, designated by $\bar{\omega}$, to be parallel to—for example—the polar axis of the earth. When $\bar{\omega}$ is parallel to the polar axis of the earth, it is elevated above the local horizon by the latitude angle $\phi$ and it lies in the local meridian plane. The angle between the pitch axis and the local meridian plane which includes the aligned vector $\bar{\omega}$ is designated $\gamma$.

An angle between the initial Y axis direction $Y_0$ and the pitch or cross-level axis is measured about the axis of shafts 22 and 23 by, for example, synchro 184. A pitch angle (not shown in FIG. 3) between gimbals 28 and 31 is measured about the axis of shafts 29, 30—for example —by a synchro 196.

It is to be noted that some vector other than $\bar{\omega}$, positioned upon platform 20, could be aligned parallel to the polar axis of the earth. Further, any vector fixed upon platform 20, whose components are known in the X, Y, and Z coordinate system, can be pointed in a predetermined direction whose elevation above the horizontal and and whose azimuth is known. If the predetermined direction is a known function of time, or some other variable, the vector can be programmed to align with and follow the predetermined direction.

If a cartesian coordinate system, fixed upon platform 20, were to have its X axis parallel to the axis of angular drift, $\omega$, and its remaining two axes (not shown) in a plane perpendicular to $\bar{\omega}$, the coordinates of $\bar{\omega}$ in that coordinate system would be $(\omega, 0, 0)$ where the first component is along the axis of angular drift of platform 20. Designate such a coordinate system as the $\omega$ coordinate system. If it were desirable to express or relate the components of $\bar{\omega}$ from the $\omega$ coordinate system into those of the X, Y, Z coordinate system, the following matrix equation could be used:

$$\begin{pmatrix}\omega_x\\ \omega_y\\ \omega_z\end{pmatrix}=\begin{pmatrix}\cos C & -\sin C & 0\\ \sin C & \cos C & 0\\ 0 & 0 & +1\end{pmatrix}\cdot\begin{pmatrix}\cos\mu & \sin\mu & 0\\ -\sin\mu & \cos\mu & 0\\ 0 & 0 & +1\end{pmatrix}\cdot$$
$$\begin{pmatrix}\cos P & 0 & \sin P\\ 0 & +1 & 0\\ -\sin P & 0 & \cos P\end{pmatrix}\begin{pmatrix}0 & -1 & 0\\ +1 & 0 & 0\\ 0 & 0 & 1\end{pmatrix}\cdot$$
$$\begin{pmatrix}\cos\gamma & \sin\gamma & 0\\ -\sin\gamma & \cos\gamma & 0\\ 0 & 0 & +1\end{pmatrix}\begin{pmatrix}\cos\phi & 0 & -\sin\phi\\ 0 & +1 & 0\\ \sin\phi & 0 & \cos\phi\end{pmatrix}\begin{pmatrix}\omega\\ 0\\ 0\end{pmatrix}$$

Since the X, Y, and Z coordinates of $\bar{\omega}$ are known, it is expedient to invert the above matrix equation and to mechanize the inverted equation to obtain a mechanization which is adapted to rotate gimbal 28 through the angle P and to rotate platform 20 through the angle C. When the matrix equation is inverted, it reads as follows:

$$\begin{pmatrix}\omega\\ 0\\ 0\end{pmatrix}=\begin{pmatrix}\cos\phi & 0 & \sin\phi\\ 0 & +1 & 0\\ -\sin\phi & 0 & \cos\phi\end{pmatrix}\begin{pmatrix}\cos\gamma & -\sin\gamma & 0\\ \sin\gamma & \cos\gamma & 0\\ 0 & 0 & +1\end{pmatrix}\cdot$$
$$\begin{pmatrix}0 & +1 & 0\\ -1 & 0 & 0\\ 0 & 0 & +1\end{pmatrix}\begin{pmatrix}\cos P & 0 & -\sin P\\ 0 & +1 & 0\\ \sin P & 0 & \cos P\end{pmatrix}\cdot$$
$$\begin{pmatrix}\cos\mu & -\sin\mu & 0\\ \sin\mu & \cos\mu & 0\\ 0 & 0 & +1\end{pmatrix}\begin{pmatrix}\cos C & \sin C & 0\\ -\sin C & \cos C & 0\\ 0 & 0 & +1\end{pmatrix}\begin{pmatrix}\omega_x\\ \omega_y\\ \omega_z\end{pmatrix}$$

The matrices to the right of the equal sign represent, from left to right, a rotation through an angle $(-\phi)$, a rotation through an angle $(-\gamma)$, a rotation through $(+90°)$, a rotation through an angle $(+P)$, and a rotation through an angle $(C-\mu)$.

With the $\omega$ axis properly aligned, the $\omega_x$, $\omega_y$, $\omega_z$ components can be resolved through a series of angles in accordance with the last mentioned matrix equations. The values of some of the angles are predetermined or computed. Others of the angles are obtained by solving the matrix equation.

For example, the angles P and C are not known. The matrix equation contains sufficient independent equations in C and P to obtain explicit values of C and P. It is, however, more desirable to mechanize the above equations in C and P in implicit form in which the shaft positions of two resolvers are servoed to balanced the equation.

Figure 4:
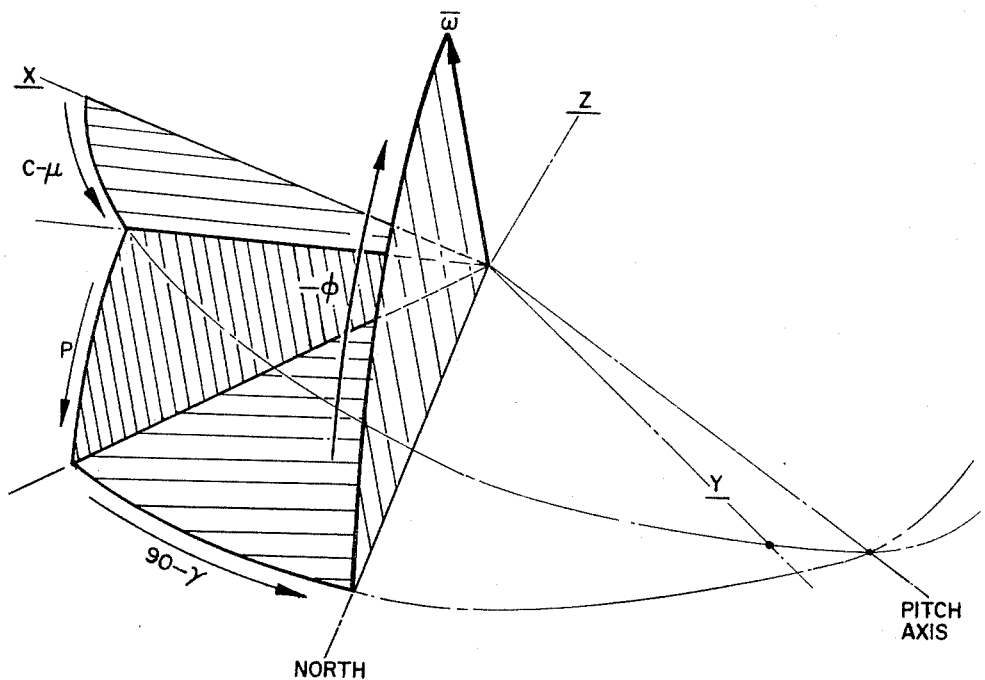
FIG. 4 is a diagram of the rotations used to derive one portion of the matrix equations used in this invention showing rotations from the X axis into the axis of the angular velocity of drift of the platform.
Figure 6:
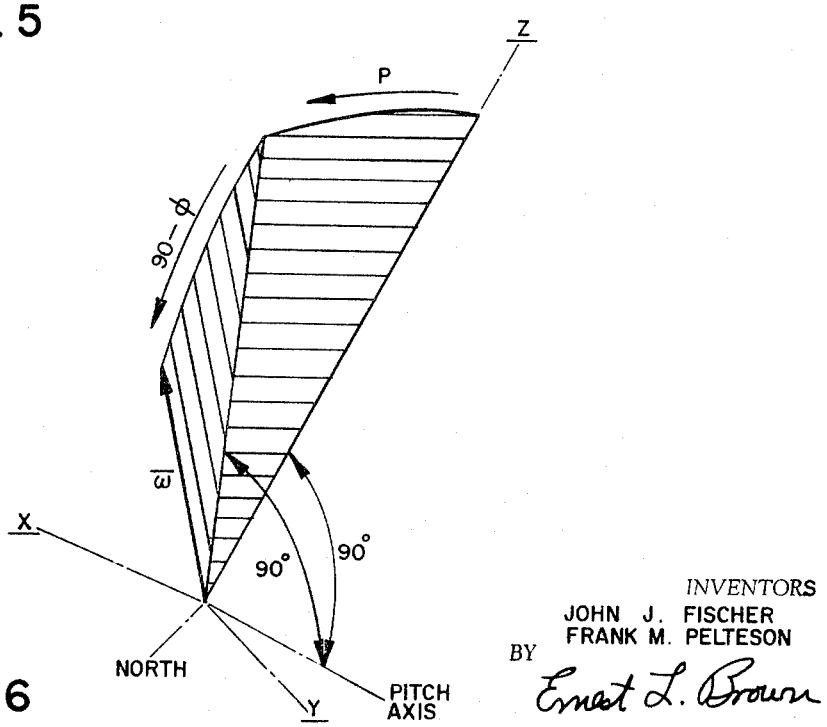
FIG. 6 is a diagram of the rotations used to derive a third portion of the matrix equations used in this invention showing rotations from the Z axis into the axis of the angular velocity of drift of the platform.

To generate the above matrix, the rotations from $\omega_x$, $\omega_y$, $\omega_z$ into $\omega$ are shown in FIGS. 4, 5, and 6.

Referring to FIG. 4, the component $\omega_x$ is related to $\omega$ by a direction cosine that is based on a rotation through an angle $(C-\mu)$ about the Z axis, through an angle P about the pitch axis, through an angle $(90°-\gamma)$ about a vertical axis, and through an angle $(-\phi)$ about a horizontal east-west axis.

Referring to FIG. 5, the component $\omega_y$ is related to $\omega$ by a direction cosine that is based on a rotation about the Z axis through an angle $(C-\mu)$, about a vertical axis through an angle $(-\gamma)$, and about a horizontal east-west axis through an angle $(-\phi)$.

Referring to FIG. 6, the $\omega_z$ component of $\omega$ is based on a rotation about the pitch axis through an angle P, and about a horizontal east-west axis through an angle $(90°-\phi)$.

Figure 7:
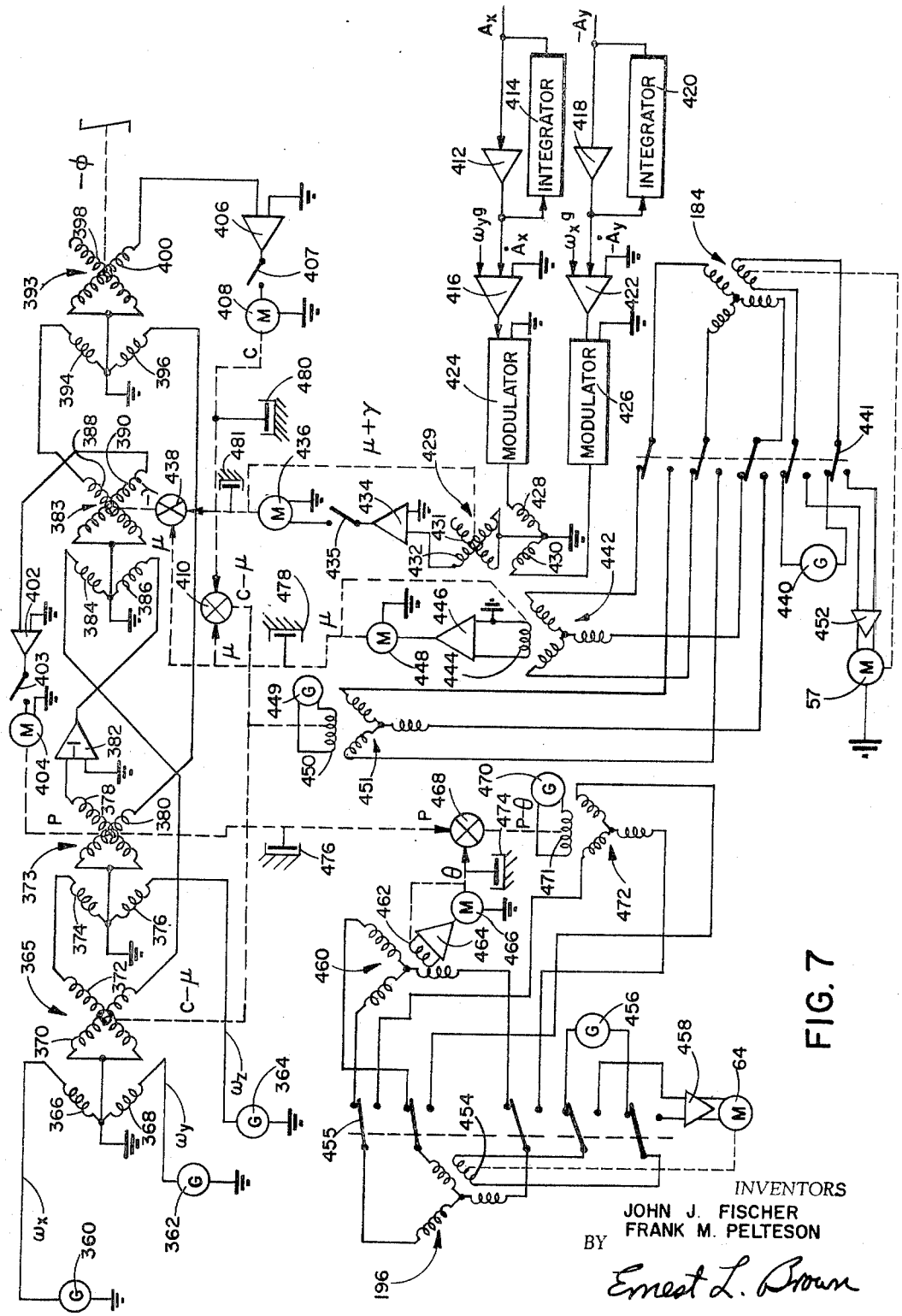
FIG. 7 is a schematic circuit diagram of a preferred means for aligning the axis of angular velocity of drift of the platform parallel to the polar axis of the earth.

The calculation of the rotations described above in connection with FIGS. 4, 5, and 6 are mechanized in the electrical circuit shown in FIG. 7. The unknown angles P and C are obtained by servoing the shafts of resolvers 373 and 365 to balance the above mentioned inverted matrix equation. By driving the shafts of resolvers to balance the above equation, their shaft rotation becomes a measure of the angles P and $(C-\mu)$. The shaft position of the respective resolvers can then be used to servo the gimbals 28 and 20 into a position to align $\bar{\omega}$ with the polar axis of the earth.

The mechanization of this invention, adapted to cause the above mentioned alignment, is shown in FIG. 7.

In FIG. 7, the shaft of resolver 365 is servoed to be driven through an angle $(C-\mu)$, the shaft of resolver 373 is servoed to be driven through an angle P, the shaft of resolver 383 is driven through an angle $(-\gamma)$, and the shaft of resolver 393 is set through an angle which is a measure of $(-\phi)$.

Three alternating voltage sources 360, 362, and 364 have voltage amplitudes which are adjusted to be a measure of $\omega_x$, $\omega_y$, and $\omega_z$, respectively. With reference to applicants' aforesaid patent, the amplitudes of these voltages are set in proportion to the readings of dials 322, 324, and 326, respectively, in FIG. 9 thereof.

The $\omega_x$ voltage of voltage source 360 is connected to stator winding 366 and the $\omega_y$ voltage of voltage source 362 is connected to stator winding 368 of resolver 365. The common terminal of stator windings 366 and 368 and the common terminal of rotor windings 370 and 372 are connected to the ground terminal. The shaft angle of resolver 365 is servoed through an angle which is proportional to $(C-\mu)$. The voltage across rotor winding 372 is proportional to $\omega_x$ times the cosine of the shaft angle plus $\omega_y$ times the sine of $(C-\mu)$. The voltage across rotor winding 370 is proportional to minus $\omega_x$ times the sine of $(C-\mu)$ plus $\omega_y$ times the cosine of $(C-\mu)$.

The $\omega_z$ voltage of voltage source 364 is connected to stator winding 376 of resolver 373. Winding 372 is connected to stator winding 374 of resolver 373. The common terminal of stator windings 374 and 376 and the common terminal of rotor windings 378 and 380 of resolver 373 are grounded. The shaft angle of resolver 373 is proportional to P. The voltage across rotor winding 378 is proportional to the voltage applied to winding 374 times the cosine of P minus $\omega_z$ times the sine of P. The voltage appearing across rotor winding 380 is proportional to minus the voltage appearing across stator winding 374 times the sine of P plus $\omega_x$ times the cosine of P.

Amplifier 382 inverts the voltage appearing across winding 378. The inverted voltage is applied from amplifier 382 to stator winding 386 to resolver 383. Rotor winding 370 of resolver 365 is connected to stator winding 384 of resolver 383. The common terminal of stator windings 384 and 386 and the common terminal of rotor windings 388 and 390 are grounded. The shaft of resolver 383 is driven through an angle $(-\gamma)$. The voltage across winding 388 is proportional to the voltage applied to winding 384 times the cosine of $(-\gamma)$ minus the voltage applied to winding 386 times the sine of $(-\gamma)$. The voltage appearing across rotor winding 390 is proportional to the voltage appearing across stator winding 384 times the sine of $(-\gamma)$ plus the voltage appearing across winding 386 times the cosine of $(-\gamma)$.

The voltage across rotor winding 388 is connected to stator winding 394 of resolver 393. The voltage of rotor winding 380 of resolver 373 is connected to stator winding 396 of resolver 393. The common terminal of stator windings 394 and 396 and the common terminal of rotor windings 398 and 400 are grounded. The shaft angle of resolver 393 is adjusted to an angle which is a measure of $(-\phi)$. The voltage appearing across rotor winding 400 of resolver 393 is proportional to minus the voltage applied to winding 394 times the sine of $(-\phi)$ plus the voltage applied to winding 396 times the cosine of $(-\phi)$.

The voltage of rotor winding 390 of resolver 383 is connected through amplifier 402 and switch 403 to motor 404 which drives the shaft of resolver 373.

Winding 400 of resolver 393 is connected through amplifier 406 and switch 407 to motor 408 whose shaft is connected to a mechanical differential 410. The angle of the shaft of motor 408 turns out to be proportional to the angle C when a shaft angle proportional to $\mu$ is connected to mechanical differential 410 to be combined with the shaft angle of motor 408 to drive the shaft of resolver 365.

The shafts of resolvers 365 and 373 are driven to maintain a zero signal at the output of windings 400 and 390, respectively.

To obtain a shaft position which is a measure of the angle $(\mu+\gamma)$, $A_x$ and $-A_y$ outputs of accelerometers 38 and 40 are connected, respectively, to the inputs of amplifiers 412 and 418. Integrators 414 and 420 are fed back around amplifiers 412 and 418 to cause each amplifier and integrator combination to be a differentiating circuit. The output of the differentiator combination of amplifiers 412 and integrator 414 is connected to the input of a summing amplifier 416. The output of the differentiating combination of amplifier 418 and feed-back integrator 420 is connected to the input of summing amplifier 422. Signals proportional to $\omega_y$ times $g$ and $\omega_x$ times $g$, obtained from appropriate voltage sources (not shown), are connected to the inputs of amplifiers 416 and 422, respectively. The outputs of amplifiers 416 and 422 are connected through modulators 424 and 426, respectively, to stator windings 428 and 430 of resolver 429. The common terminal of stator windings 428 and 430 and the common terminal of rotor windings 431 and 432 are grounded. Rotor winding 432 is connected through amplifier 434 and through switch 435 to motor 436 to drive the shaft thereof through an angle which is proportional to $(\mu+\gamma)$. The shaft of motor 436 is connected to drive the shaft of resolver 429 in a direction to cause the signal applied to amplifier 434 to approach zero.

A brake 481 is connected to the shaft of motor 436. After the shaft has come to its rest position, at an angle $(\mu+\gamma)$, the brake 481 may be mechanically applied or electromagnetically applied. Simultaneously with the applying of brake 481, switch 435 is opened to de-energize motor 436.

The angle $\gamma$ is the initial azimuth of the cross-level or pitch axis. The angle $\mu$ is the angle between the cross-level axis and the Y axis on platform 20 at the moment when the Y axis is level before alignment of vector $\overline{\omega}$. Thus, the angle $(\mu+\gamma)$ is the angle between the Y axis and the true north direction at the moment when platform 20 is level.

A signal which is a measure of $\mu$ is generated on the rotor of synchro 184 when synchro 184 is energized by an alternating voltage source such as generator 440. When switch 441 is in its upper position, alternator 440 excites synchro 184 which transmits a signal to the rotor of synchro 442. Rotor 444 of synchro 442 is connected through amplifier 446 to drive motor 448 whose shaft then drives the rotor 444 in a direction to return to zero the signal at the input of amplifier 446. The shaft rotation of motor 448 is then proportional to the angle $\mu$. The shaft of motor 448 is connected to mechanical differential 438 where its rotation is combined with the rotation of the shaft of motor 436 to generate a shaft rotation to drive the rotor of resolver 383 through an angle which is a measure of $(-\gamma)$.

The shaft of motor 448 is also connected to gear train differential 410 to generate a shaft rotation to drive the rotor of resolver 365 through an angle proportional to $(C-\mu)$.

With switch 455 in its upward position, alternator 456 is connected to rotor 454 of synchro 196 upon the cross-lever or pitch axis of the platform to generate a signal upon the rotor of synchro 196 which is a measure of the pitch angle. The rotor of synchro 196 is connected to the stator of synchro 460 to generate a signal upon the rotor 462 of synchro 460. The rotor 462 is connected through amplifier 464 to drive motor 466. The shaft of motor 466 is connected to drive rotor 462 in a direction to reduce the signal applied to motor 466. Thus, the shaft of motor 466 becomes a measure of the pitch angle $\theta$.

The shaft of motor 466 is connected to a differential gear train 468. The shaft of motor 404 also is connected to differential gear train 468. The rotor 471 of synchro 472 is driven to an angle which is proportional to the difference between the pitch angle $\theta$ and the desired pitch angle P. The rotor 471 of synchro 472 is energized by alternator 470.

A plurality of braking means 476, 478, 480, 474, and 481 are connected to the shafts indicated in FIG. 7. These brakes may be mechanically set or, alternatively, may be set by electromagnetic means (not shown).

When switch 455 is switched into its downward position, motor 64 is connected through amplifier 458 and switch 455 to rotor 454 of synchro 196 to be driven in response to the signal appearing thereon. The stator of synchro 196 is connected to the stator of synchro 472.

When switch 441 is moved into its downward position, motor 57 is connected through amplifier 452 and switch 441 to the rotor of synchro 184. The stator of synchro 184 is connected to the stator of synchro 451. The rotor of synchro 451 is connected to be driven by the output shaft of differential gear train 410. The rotor 450 is energized by alternator 449.

In operation, platform 20 is first leveled as above stated. The cross-level axis of shafts 29 and 30 is initially pointed in a substantially westerly direction. The Y axis also is pointed in a substantially westerly direction. The X axis is accordingly pointed substantially parallel to the axis of shafts 26 and 27. The Y accelerometer 40 is connected (perhaps by switches, not shown) through amplifier 180 to control motor 66 and the X accelerometer is connected through amplifier 182 to control motor 64.

After the platform 20 has been leveled, platform 20 is connected as shown in FIG. 2 to be controlled by the inertial angular reference devices 80, 82, and 84. The accelerometer outputs of accelerometers 38 and 40 are connected, with the proper polarity, to amplifiers 412 and 418, shown in FIG. 7. The time derivatives of the outputs of accelerometers 38 and 40 are a measure of the angular rotation of platform 20 relative to the earth. The outputs of the differentiating circuits associated with amplifiers 412 and 418 are measures of the components of angular velocity of the platform 20 relative to the earth about the Y and X axes, respectively. Input signals representative of a factor proportional to the angular drift of platform 20 relative to inertial space about the Y and X axes are subtracted out in amplifiers 416 and 422, respectively. Thus, the outputs of amplifiers 416 and 422 are a measure of the angular rotation of platform 20 due only to earth's rotation.

The outputs of amplifiers 416 and 422 are modulated to obtain alternating signals which are proportional in amplitude to the amplitude at the output of amplifiers 416 and 422 and which have a phase which depends upon the polarity of the voltage at the outputs of amplifiers 416 and 422. The outputs of modulators 424 and 426, connected through resolver 429 and amplifier 434, cause the shaft of motor 436 to have an angle which is a measure of $(\mu+\gamma)$. As soon as the shaft of motor 436 reaches a steady value, switch 435 is opened and brake 481 is locked to prevent further rotation of the shaft of motor 436.

Synchro 184 is connected to synchro 442 to cause the shaft of motor 448 to repeat the angle $\mu$. The angle $\mu$ is combined in gear train differential 438 with the angle $(\mu+\gamma)$ to generate a shaft output which is a measure of the angle $(-\gamma)$. Thus, the shaft of resolver 383 is positioned at the angle $(-\gamma)$.

The shaft of resolver 393 is set at a known angle $(-\phi)$ which is the negative of the local latitude angle.

Voltage appearing at the winding 390 of resolver 383 causes motor 404 to drive the shaft of resolver 373 in a direction to cause the said voltage to move toward zero.

Voltage at the output of winding 400 of resolver 393 causes motor 408 to drive its shaft in a direction whereby when the shaft rotation of motor 408 is combined with the shaft rotation of motor 448 through gear train 410, resolver 365 is driven in a direction to reduce the voltage at winding 400 towards zero. The shaft of resolvers 373 and 365 come to rest at angles P and $(C-\mu)$, respectively.

Brakes 480, 478, 476, and 474 are then set to prevent rotation of the shafts of motors 408, 448, 404, and 466. Switches 407 and 403 are opened. Switches 455 and 441 are moved into their downward position.

The shaft of motor 57 is now servoed in a direction to cause the voltage appearing at the rotor of synchro 184 to approach zero. When the rotor of synchro 184 and motor 57 are turned to zero voltage on the rotor, the shaft will then be turned to rotate the Y axis about the axis of shaft 22 through an angle $(C-\mu)$ relative to the cross-level or pitch axis.

Motor 64 drives its shaft in a direction to cause the voltage to approach zero at the rotor 454 of synchro 196. When the voltage on winding 454 reaches zero, the shaft of motor 64 has positioned the XY plane at an angle P relative to the horizontal plane 351, and $P-\theta$ relative to gimbal 31.

Thus, $\overline{\omega}$ has been moved into alignment with the polar axis of the earth. When control of the platform is switched to the circuit shown in FIG. 2, $\overline{\omega}$ remains parallel to the axis of the earth.

It may be desired to point any axis, fixed on platform 20, whose direction cosines $a_x$, $a_y$, $a_z$ are known in X, Y, Z coordinates, parallel to a known direction whose elevation angle $x$ and whose azimuth angle $\tau$ are known. Adjust the amplitudes of voltage of sources 360, 362, 364 proportional to $a_x$, $a_y$, $a_z$ respectively. Adjust the shaft of resolver 393 to an angle proportional to $(-x)$, and servo motor 436 to have a shaft angle $(\mu+\gamma+\tau)$, lock brake 481, then proceed as described above.

Thus the method and means of this invention are adapted to align the line of action of a predetermined vector on a gimbaled platform parallel to an axis in earth coordinates, particularly to facilitate the mechanization of guidance systems or the like.

Although this invention has been described in detail above, it is not intended that the invention should be limited by the description but only in accordance with the spirit and scope of the appended claims.

We claim:

1. A method for aligning a first predetermined axis whose direction is known relative to a platform with a second predetermined axis whose direction is known with respect to the earth, said platform being gimbaled with respect to the earth on at least three gimbals having a non-vertical outer axis, a horizontal cross-level axis, and an inner axis perpendicular to said cross-level axis, said platform having an X, Y, Z orthogonal coordinate system fixed thereon with the Z axis aligned with the inner axis comprising the steps of:

leveling the XY plane of said platform;

measuring the angle about said inner axis between the Y-axis of said X, Y, Z coordinate system and the cross-level axis when said Y axis is level;

determining the azimuth of said cross-level axis with respect to said second predetermined axis;

computing the factors C and P from the following matrix equation $$\begin{pmatrix}\omega\\0\\0\end{pmatrix}=\begin{pmatrix}\cos\phi & 0 & \sin\phi\\ 0 & +1 & 0\\ -\sin\phi & 0 & \cos\phi\end{pmatrix}\cdot\begin{pmatrix}\cos\gamma & -\sin\gamma & 0\\ \sin\gamma & \cos\gamma & 0\\ 0 & 0 & +1\end{pmatrix}\cdot$$
$$\begin{pmatrix}0 & +1 & 0\\ -1 & 0 & 0\\ 0 & 0 & +1\end{pmatrix}\begin{pmatrix}\cos P & 0 & -\sin P\\ 0 & +1 & 0\\ \sin P & 0 & \cos P\end{pmatrix}\cdot$$
$$\begin{pmatrix}\cos\mu & -\sin\mu & 0\\ \sin\mu & \cos\mu & 0\\ 0 & 0 & +1\end{pmatrix}\cdot\begin{pmatrix}\cos C & \sin C & 0\\ -\sin C & \cos C & 0\\ 0 & 0 & +1\end{pmatrix}\cdot\begin{pmatrix}\omega_x\\ \omega_y\\ \omega_z\end{pmatrix}$$

in which $\omega_x$, $\omega_y$, $\omega_z$ are components of a vector $\overline{\omega}$ colinear with said first predetermined axis, expressed in said X, Y, Z orthogonal coordinate system, $\phi$ is the known local elevation angle of the second predetermined axis, and $\gamma$ is the angle between said cross-level axis and the bearing of said second predetermined axis;

and positioning said platform about said cross-level axis through an angle P and about said inner axis through an angle C to align said first predetermined axis of the vector $\overline{\omega}$ parallel with said second predetermined axis.

2. A method for aligning a first predetermined axis whose direction is known relative to a platform with the polar axis of the earth, said platform being gimbaled with respect to the earth on at least three gimbals having a non-vertical axis, a horizontal cross-level axis, and an inner axis perpendicular to said cross-level axis, said platform having an X, Y, Z orthogonal coordinate system fixed thereon with the Z axis aligned with the inner axis, comprising the steps of:

leveling the XY plane of said platform;

measuring the angle about said inner axis between the Y-axis of said X, Y, Z coordinate system and the cross-level axis when said Y axis is level;

determining the azimuth of said cross-level axis with respect to said second predetermined axis;

computing the factors C and P from the following matrix equation $$\begin{pmatrix}\omega\\0\\0\end{pmatrix}=\begin{pmatrix}\cos\phi & 0 & \sin\phi\\ 0 & +1 & 0\\ -\sin\phi & 0 & \cos\phi\end{pmatrix}\cdot\begin{pmatrix}\cos\gamma & -\sin\gamma & 0\\ \sin\gamma & \cos\gamma & 0\\ 0 & 0 & +1\end{pmatrix}\cdot$$
$$\begin{pmatrix}0 & +1 & 0\\ -1 & 0 & 0\\ 0 & 0 & +1\end{pmatrix}\begin{pmatrix}\cos P & 0 & -\sin P\\ 0 & +1 & 0\\ \sin P & 0 & \cos P\end{pmatrix}\cdot$$
$$\begin{pmatrix}\cos\mu & -\sin\mu & 0\\ \sin\mu & \cos\mu & 0\\ 0 & 0 & +1\end{pmatrix}\cdot\begin{pmatrix}\cos C & \sin C & 0\\ -\sin C & \cos C & 0\\ 0 & 0 & +1\end{pmatrix}\cdot\begin{pmatrix}\omega_x\\ \omega_y\\ \omega_z\end{pmatrix}$$

in which $\omega_x$, $\omega_y$, and $\omega_z$ are components in said X, Y, and Z orthogonal coordinate system, of a vector $\overline{\omega}$ colinear with said first predetermined axis, $\phi$ is the known local latitude angle, and $\gamma$ is the azimuth angle of said cross-level axis; and positioning said platform about said cross-level axis through an angle C about said inner axis and through an angle P about said cross-level axis to align said first predetermined axis of the vector $\overline{\omega}$ parallel with the polar axis of the earth.

3. In a platform gimbaled with respect to the earth, including a first gimbal having a non-vertical outer axis, a second gimbal having a horizontal cross-level axis, and a third gimbal having an inner axis maintained perpendicular to said cross-level axis, said platform mounted on said third gimbal for rotation about said inner axis, means for aligning an axis which is fixed on said platform and whose direction cosines are known relative to a coordinate system in said platform, with an axis whose elevation angle and azimuth angle are known relative to the earth comprising:

first measuring means attached to said first and second gimbals to measure the angle about said cross-level axis between said first and second gimbals;

second measuring means attached to said third gimbal and said platform to measure the angle about said inner axis between said platform and said third gimbal;

means for calculating the required rotation angle about said cross-level axis between said first and second gimbals and means for calculating the required rotation angle about said inner axis between said platform and said third gimbal to align said axis whose direction cosines are known parallel with said axis whose elevation angle and azimuth angle are known;

means for determining the difference between said related measured angles and said calculated angles; and means for causing said gimbals to rotate about their respective axes to align said axis whose direction cosines are known parallel with said axis whose elevation angle and azimuth are known.

4. In combination:

a platform, having an X, Y, and Z set of orthogonal coordinates fixed thereon;

at least a three axis gimbal system supporting said platform for freedom of rotation relative to the earth, the axes of rotation of said gimbal system being a non-vertical outer axis, a horizontal cross-level axis, and an inner axis perpendicular to said cross-level axis;

means for sensing and measuring acceleration on said platform in at least the X and Y directions;

means for differentiating the acceleration signals from said X and Y accelerometers;

means for generating a first signal which is proportional to the angular velocity of drift of said platform about the Y axis relative to inertial space;

means for generating a second signal which is proportional to the angular velocity of drift of said platform about the X axis relative to inertial space;

summing means for creating a third signal which is a measure of the sum of said first signal plus said differentiated X axis accelerometer signal;

second summing means for creating a fourth signal which is a measure of the difference of said second signal minus said differentiated Y axis accelerometer signal; resolver means connected to be excited by said summing means, amplifier means connected to amplify output signals of said resolver means; and motor means connected to be controlled by signals from said last named amplifier means and connected to drive the rotor of said resolver means to position the shaft of said motor means at an angle which is a measure of the angle between the Y axis and true north.

References Cited by the Examiner
UNITED STATES PATENTS
3,104,545   9/1963   Draper et al.

OTHER REFERENCES

Daigle, F. F.: Inertial Navigation, Part III, Inertial Stabilization, pp. 40–43 in RCA Engineer, vol. 5, No. 3 October-November 1959.

ROBERT B. HULL, *Primary Examiner*.